US012027898B2

(12) United States Patent
Bhuiyan et al.

(10) Patent No.: US 12,027,898 B2
(45) Date of Patent: Jul. 2, 2024

(54) BATTERY PACK HAVING BATTERY CELL DRAINAGE PREVENTION CIRCUITRY

(71) Applicant: BLACK & DECKER INC., New Britain, CT (US)

(72) Inventors: Mahmudul Bhuiyan, Centereach, NY (US); Marc W. McKinley, York, PA (US); Abhisheka Moturu, Pikesville, MD (US); Michael Muilwyk, Felton, PA (US)

(73) Assignee: BLACK & DECKER INC., New Britain, CT (US)

( * ) Notice: Subject to any disclaimer, the term of this patent is extended or adjusted under 35 U.S.C. 154(b) by 428 days.

(21) Appl. No.: 17/224,723

(22) Filed: Apr. 7, 2021

(65) Prior Publication Data

US 2021/0313814 A1 Oct. 7, 2021

Related U.S. Application Data

(60) Provisional application No. 63/006,235, filed on Apr. 7, 2020.

(51) Int. Cl.
*H02J 7/00* (2006.01)

(52) U.S. Cl.
CPC ........ *H02J 7/0031* (2013.01); *H02J 7/00038* (2020.01); *H02J 7/0013* (2013.01)

(58) Field of Classification Search
USPC ................................................. 320/106, 116
See application file for complete search history.

(56) References Cited

U.S. PATENT DOCUMENTS

| 5,717,306 A * | 2/1998 | Shipp ................... H01M 10/48 429/90 |
| 9,431,684 B2 * | 8/2016 | Wang .................. H01M 10/482 |
| 9,947,972 B2 * | 4/2018 | Ozawa ................ H01M 10/425 |
| 2006/0087286 A1 * | 4/2006 | Phillips ............... H01M 10/441 320/114 |
| 2011/0198103 A1 * | 8/2011 | Suzuki ................. H02J 7/0048 173/46 |
| 2013/0234721 A1 * | 9/2013 | Nakamura .......... H01M 10/425 324/426 |

\* cited by examiner

*Primary Examiner* — Samuel Berhanu
(74) *Attorney, Agent, or Firm* — Michael Aronoff

(57) ABSTRACT

The present disclosure is directed to a battery pack and a power tool system including a power tool, a battery pack and a battery pack charger. The battery pack includes circuitry to prevent electricity drainage from a plurality of battery cells when the battery pack is only partially mated to the power tool or the battery pack charger.

9 Claims, 18 Drawing Sheets

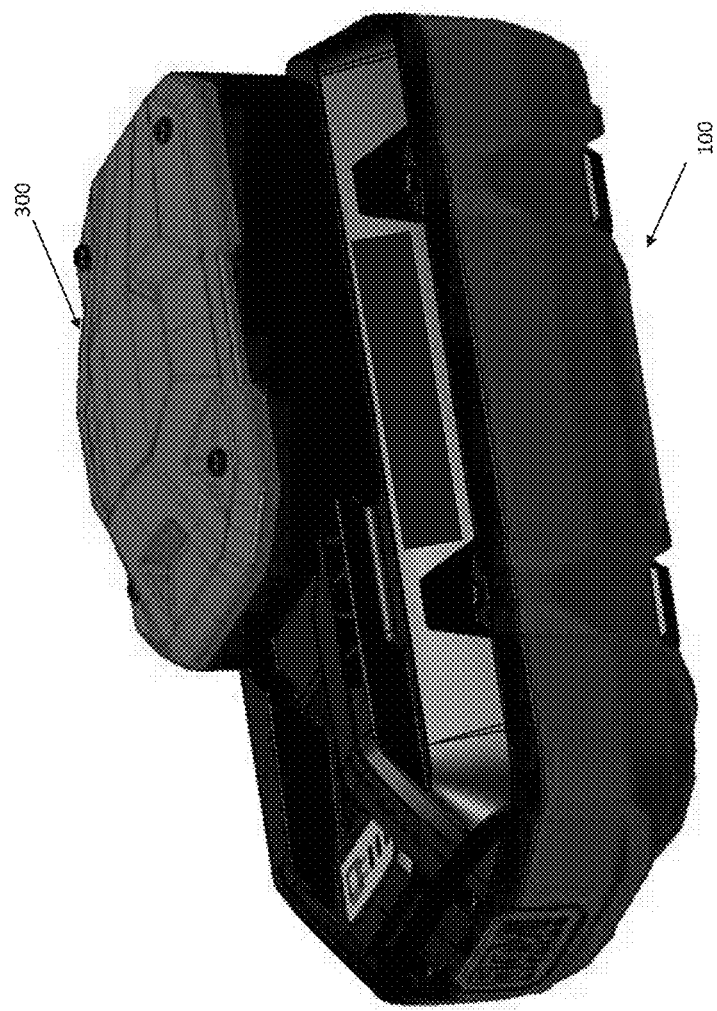
FIG. 5
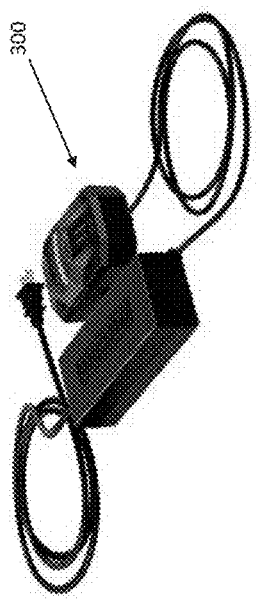
FIG. 3
FIG. 4

BATTERY PACK HAVING BATTERY CELL DRAINAGE PREVENTION CIRCUITRY

RELATED APPLICATIONS

This application claims priority under 35 U.S.C. § 119(e) to U.S. Provisional Patent Application No. 63/006,235, filed Apr. 7, 2020, titled "Battery Pack Having Battery Cell Drainage Prevention Circuit."

TECHNICAL FIELD

This application relates to a battery pack including circuitry for preventing the drainage of battery cells of the battery pack. In one implementation, the battery pack includes circuitry for prevention drainage of the battery cells when the battery pack is partially inserted in a power tool or a charger.

BACKGROUND

An example power tool system may include at least one power tool, at least one removable and rechargeable battery pack and at least one battery pack charger.

Referring to FIGS. 1 through 7, an example embodiment of a first battery pack includes a housing. The housing includes an upper housing/portion and a lower housing/portion. The upper housing includes a mechanical interface for mating and coupling with a power tool 200 having a corresponding mechanical interface 206 and/or a battery charger 300 having a corresponding mechanical interface 306. The battery pack mechanical interface includes a pair of rails and a pair of grooves. The grooves receive a corresponding pair of rails of the power tool and/or the battery charger. The battery pack mechanical interface also includes a plurality of slots. The plurality of slots is configured to receive a corresponding plurality (set) of power tool terminals and/or battery charger terminals—as the case may be—that mechanically and electrically mate with a corresponding plurality (set) of battery pack terminals. The plurality of slots defines a plurality of parallel planes. The battery pack is inserted into the power tool and/or the battery charger in a direction parallel with the plurality of slots and the plurality of parallel planes, i.e., the insertion direction. The insertion direction is denoted by arrow A.

The example battery pack may include two or more strings (sets) of battery cells. For example, an A string, a B string and a C string. Each string of battery cells may include one or more blocks of battery cells. If there is more than one block of battery cells in a string of battery cells, the blocks of battery cells within the string are connected to each other in series. Each block of battery cells may include one or more battery cells. If there is more than one battery cell in a block of battery cells, the battery cells within the block are connected to each other in parallel.

Referring to FIGS. 6 and 8, each string of battery cells includes a positive terminal and a negative terminal. For example, the A string has a positive terminal—referred to as an A+ terminal—and a negative terminal—referred to as an A− terminal, the B string has a positive terminal—referred to as a B+ terminal—and a negative terminal—referred to as a B− terminal, and the C string has a positive terminal—referred to as a C+ terminal—and a negative terminal—referred to as a C− terminal. In the example battery pack, the strings of battery cells are electrically isolated from each other. As such, when the battery pack is in a default state (not connected to a power tool or a battery charger or any other device), the terminals of a string of battery cells are not connected to the terminals of any other string of battery cells. In addition, each of the string terminals is connected to a single battery pack terminal BT. In the illustrated example, the B+ terminal is connected to battery terminal 1 (BT1), the A+ terminal is connected to BT2, the A− terminal is connected to BT3, the B− terminal is connected to BT4, the C+ terminal is connected to BT5 and the C− terminal is connected to BT8.

As illustrated, for example, in FIGS. 6 and 8, the physical layout of the battery pack terminals includes a first row of battery pack terminals—extending in a direction perpendicular to the mating direction A and positioned proximate a forward or front end of the battery pack—and a second row of battery pack terminals—extending in a direction perpendicular to the mating direction A, parallel to the first row of battery pack terminals and closer to a rearward or rear end of the battery pack than the first row of battery pack terminals. In this example, the first row of battery pack terminals includes battery pack terminals BT5, BT6, BT7, BT8 and the second row of battery pack terminals includes battery pack terminals BT1, BT2, BT3, BT4. The rows of battery pack terminals are positioned such that pairs of battery pack terminals are aligned in columns that extend in line with or in the direction of the mating direction A. For example, battery pack terminals BT1 and BT5 are aligned in a first column, battery pack terminals BT2 and BT6 are aligned in a second column, battery pack terminals BT3 and BT7 are aligned in a third column and battery pack terminals BT4 and BT8 are aligned in a fourth column. The columns of battery pack terminals are aligned with the battery pack slots to enable the power tool terminals or the battery charger terminals to engage and mate with the battery pack terminals. For example, the first column of battery pack terminals BT1,BT5 is aligned with a first battery pack slot 110a, the second column of battery pack terminals BT2, BT6 is aligned with a second battery pack slot 110b, the third column of battery pack terminals BT3, BT7 is aligned with a third battery pack slot 110c and the fourth column of battery pack terminals BT4, BT8 is aligned with a fourth slot 110d.

The battery pack may also include an ID circuit (ID) 150. The ID circuit 150 may be used to identify the battery pack to a connected power tool to inform the power tool of the type and capabilities of the battery pack to effect discharge of the battery pack or a connected battery charger to inform the battery charger of the type or capabilities of the battery pack to effect charge of the battery pack. The ID circuit 150 may include, for example, a simple resistor connected to ground. The ID circuit is also connected to a battery terminal, for example BT7.

The battery pack may also include a temperature sensor circuit (TH). The temperature sensor circuit may be used to monitor the temperature of the battery cells. The information from the temperature sensor circuit may be used to effect discharging and charging of the battery pack. The temperature sensor circuit may include, for example, a thermistor. The thermistor may be, for example, a negative temperature coefficient (NTC) thermistor. The temperature sensor circuit is also connected to a battery terminal, for example BT6.

In an example power tool that is designed and configured to mate and operate with the example battery pack, the power tool includes a motor and a plurality of power tool terminals (TT1-TT8). The power tool includes a terminal (TT2) connected to a positive terminal of the motor and a terminal (TT8) connected to a negative terminal of the motor.

As illustrated, for example, in FIGS. 7 and 8, the physical layout of the power tool terminals includes a first row of power tool terminals—extending in a direction perpendicular to the mating direction A and positioned proximate a forward or front end of the power tool—and a second row of power tool terminals—extending in a direction perpendicular to the mating direction A, parallel to the first row of power tool terminals and closer to a rearward or rear end of the power tool than the first row of power tool terminals. In this example, the first row of power tool terminals includes power tool terminals TT1, TT2, TT3, TT4 and the second row of power tool terminals includes power tool terminals TT5, TT6, TT8. The rows of power tool terminals are positioned such that pairs of power tool terminals are aligned in columns that extend in line with or in the direction of the mating direction A. For example, power tool terminals TT1 and TT5 are aligned in a first column, power tool terminals TT2 and TT6 are aligned in a second column, power tool terminals TT4 and TT8 are aligned in a third column. As the example power tool does not include a power tool terminal TT7 power tool terminal TT3 is not aligned with a power tool terminal in a column. However, in alternate embodiments the power tool may have a power tool terminal TT7 that aligns with power tool terminal TT3 in a column.

The power tool terminals TT are designed and configured to mate with corresponding battery pack terminals BT. Specifically, upon fully inserting/mating the battery pack with the power tool, tool terminal 1 (TT1) mates with battery terminal 1 (BT1), TT2 mates with BT2, TT3 mates with BT3, TT4 mates with BT4, TT5 mates with BT5, TT6 mates with BT6 and TT8 mates with BT8.

Referring to FIGS. 7, 8 and 10, the power tool terminals are also designed and configured to make connections between the isolated strings of battery cells of the battery pack when the battery pack is fully inserted into the power tool. In the example combination, the power tool is designed and configured to connect the strings in series. To accomplish this, there is a jumper (short circuit) between tool terminal 1 (TT1) and tool terminal 3 (TT3) and a jumper (short circuit) between tool terminal 4 (TT4) and tool terminal 5 (TT5). In alternate embodiments, the power tool may be configured with tool terminals that connect the strings of battery cells in parallel.

Referring to FIGS. 9 and 11, in an example battery pack charger that is designed and configured to mate and operate with the example battery pack, the charger includes a power supply and a plurality of battery charger terminals (CT1-CT8). The battery pack charger includes a terminal (CT2) connected to a positive terminal of the power supply and a terminal (CT8) connected to a negative terminal of the power supply. The battery pack charger also includes an ID line connected to a charger terminal CT7 at one end and to a charger control module/circuit at another end.

As illustrated, for example, in FIGS. 4 and 9, the physical layout of the battery charger terminals includes a first row of battery charger terminals—extending in a direction perpendicular to the mating direction A and positioned proximate a forward or front end of the battery charger—and a second row of battery charger terminals—extending in a direction perpendicular to the mating direction A, parallel to the first row of battery charger terminals and closer to a rearward or rear end of the battery charger than the first row of battery charger terminals. In this example, the first row of battery charger terminals includes battery charger terminals CT5, CT6, CT7, CT8 and the second row of battery charger terminals includes battery charger terminals CT1, CT2, CT3, CT4. The rows of battery charger terminals are positioned such that pairs of battery charger terminals are aligned in columns that extend in line with or in the direction of the mating direction A. For example, battery charger terminals CT1 and CT5 are aligned in a first column, battery charger terminals CT2 and CT6 are aligned in a second column, battery charger terminals CT3 and CT7 are aligned in a third column and battery charger terminals CT4 and CT8 are aligned in a fourth column.

The charger terminals CT are designed and configured to mate with corresponding battery pack terminals BT. Specifically, upon fully inserting/mating the battery pack with the charger, charger terminal 1 (CT1) mates with battery terminal 1 (BT1), CT2 mates with BT2, CT3 mates with BT3, CT4 mates with BT4, CT5 mates with BT5, CT6 mates with BT6, CT7 mates with BT7 and CT8 mates with BT8.

SUMMARY

A first aspect of the present invention includes a battery pack including a battery pack housing; a plurality of battery pack terminals; a plurality of battery cells within the battery pack housing, the plurality of battery cells electrically coupled to a set of the plurality of battery pack terminals; a battery pack identification circuit electrically coupled to one of the plurality of battery pack terminals, the battery pack identification circuit including components to that characterized the battery pack; and a controllable switch electrically coupled between the battery pack identification circuit and a ground reference.

Another aspect of the aforementioned battery pack includes a control terminal of the controllable switch electrically coupled to a terminal of one of the plurality of battery cells.

Another aspect of the aforementioned battery pack includes an interface for mating with a corresponding interface of a power tool and wherein the controllable switch is set to a closed state when the battery pack interface is fully mated to the power tool interface.

Another aspect of the aforementioned battery pack includes an interface for mating with a corresponding interface of a battery pack charger and wherein the controllable switch is set to a closed state when the battery pack interface is fully mated to the battery pack charger.

Another aspect of the aforementioned battery pack includes the plurality of battery cells coupled together in a first string of serially connected cells and a second string of serially connected cells and the first string of cells and the second string of cells are serially connected when the battery pack is fully mated to the power tool.

Another aspect of the aforementioned battery pack includes the plurality of battery cells are coupled together in a first string of serially connected cells and a second string of serially connected cells and the first string of cells and the second string of cells are serially connected when the battery pack is fully mated to the battery pack charger.

Another aspect of the present invention includes a method of operating a battery pack, comprising the steps of providing battery pack having a battery pack housing, a plurality of battery pack terminals, a plurality of battery cells within the battery pack housing, the plurality of battery cells electrically coupled to a set of the plurality of battery pack terminals, a battery pack identification circuit electrically coupled to one of the plurality of battery pack terminals, the battery pack identification circuit including components to that characterized the battery pack, and a controllable switch electrically coupled between the battery pack identification circuit and a ground reference and controlling the controllable switch to close when the battery pack is fully mated with a power tool.

Another aspect of the aforementioned method includes the step of electrically coupling a control terminal of the controllable switch to a terminal of one of the plurality of battery cells.

Another aspect of the aforementioned method includes the step of coupling the plurality of battery cells together in a first string of serially connected cells and a second string of serially connected cells and coupling the first string of cells and the second string of cells in series when the battery pack is fully mated to the power tool.

These and other advantages and features will be apparent from the description and the drawings.

BRIEF DESCRIPTION OF THE DRAWINGS

FIG. 3 is an isometric view of a first example battery pack charger.

FIG. 4 is an isometric view of an attachment portion of the battery pack charger of FIG. 3.

FIG. 5 is an isometric view of the battery pack of FIG. 1 mated with the attachment portion of FIG. 4.

DETAILED DESCRIPTION

Figure 13:
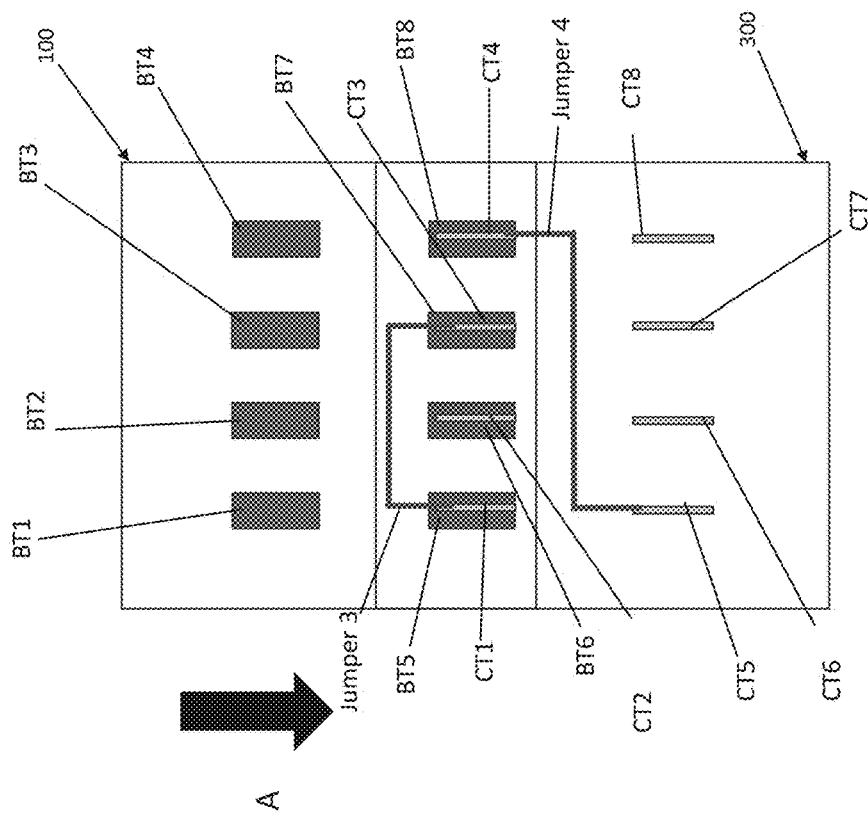
FIG. 13 is a simplified block diagram of the terminal layout of the battery charger and battery pack of FIG. 5 at partial insertion of the battery pack with the battery charger.
Figure 12:
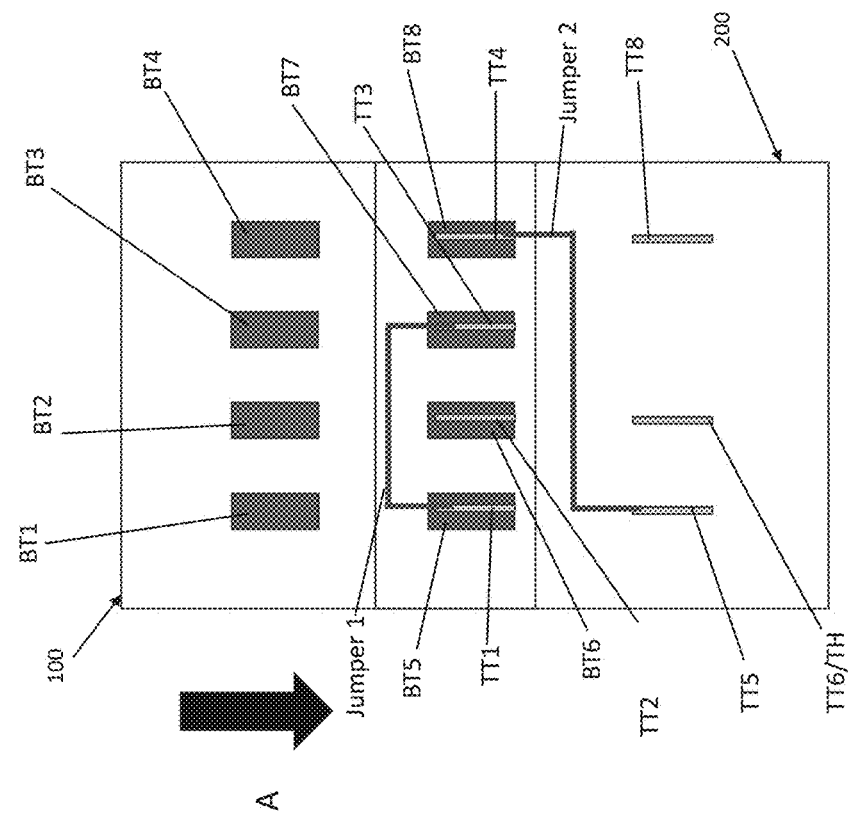
FIG. 12 is a simplified block diagram of the terminal layout of the power tool and battery pack of FIG. 2 at partial insertion of the battery pack with the power tool.
Figure 14:
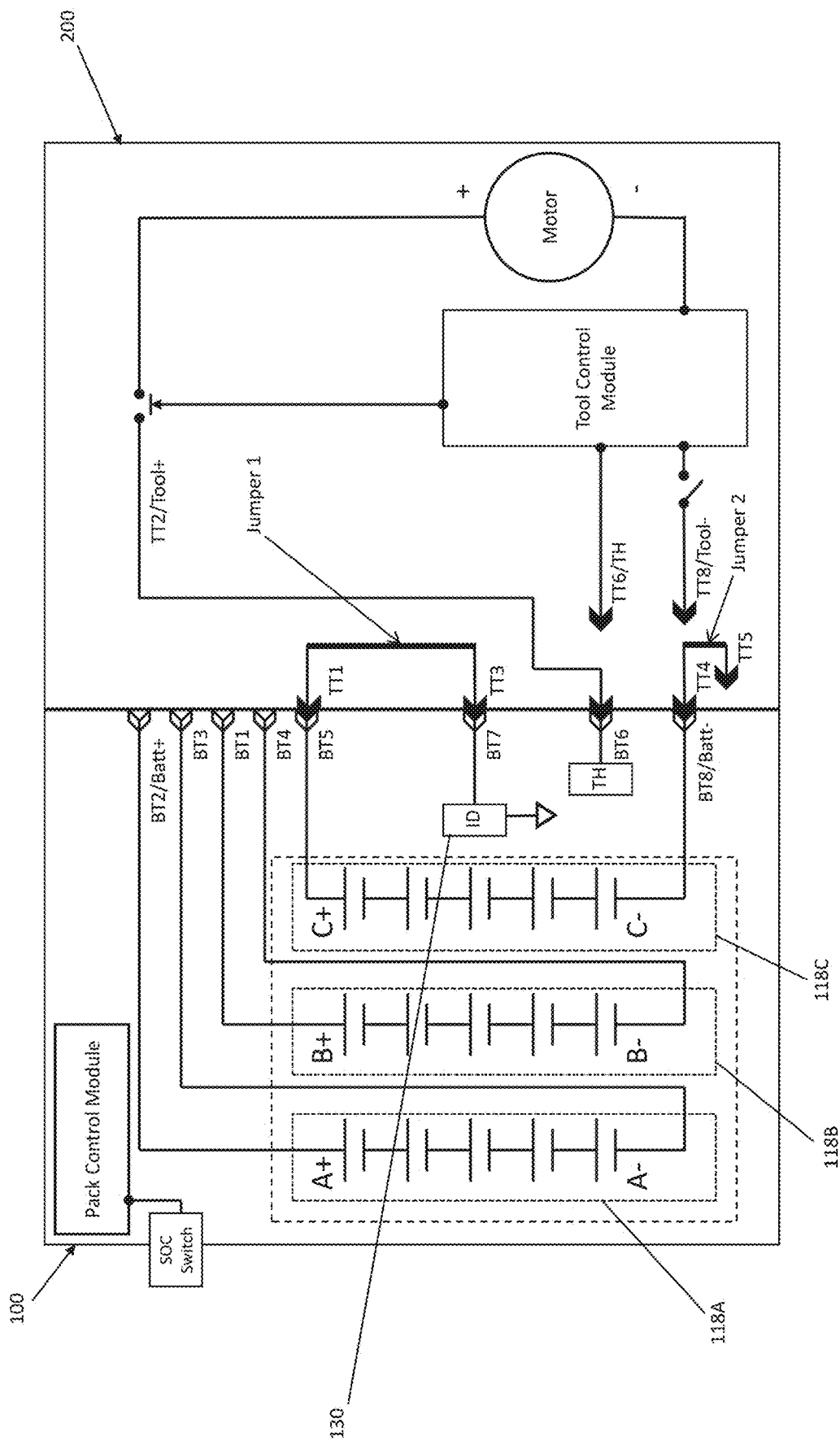
FIG. 14 is a simplified schematic diagram of the power tool and a conventional battery pack of FIG. 2 at partial insertion of the battery pack with the power tool.
Figure 15:
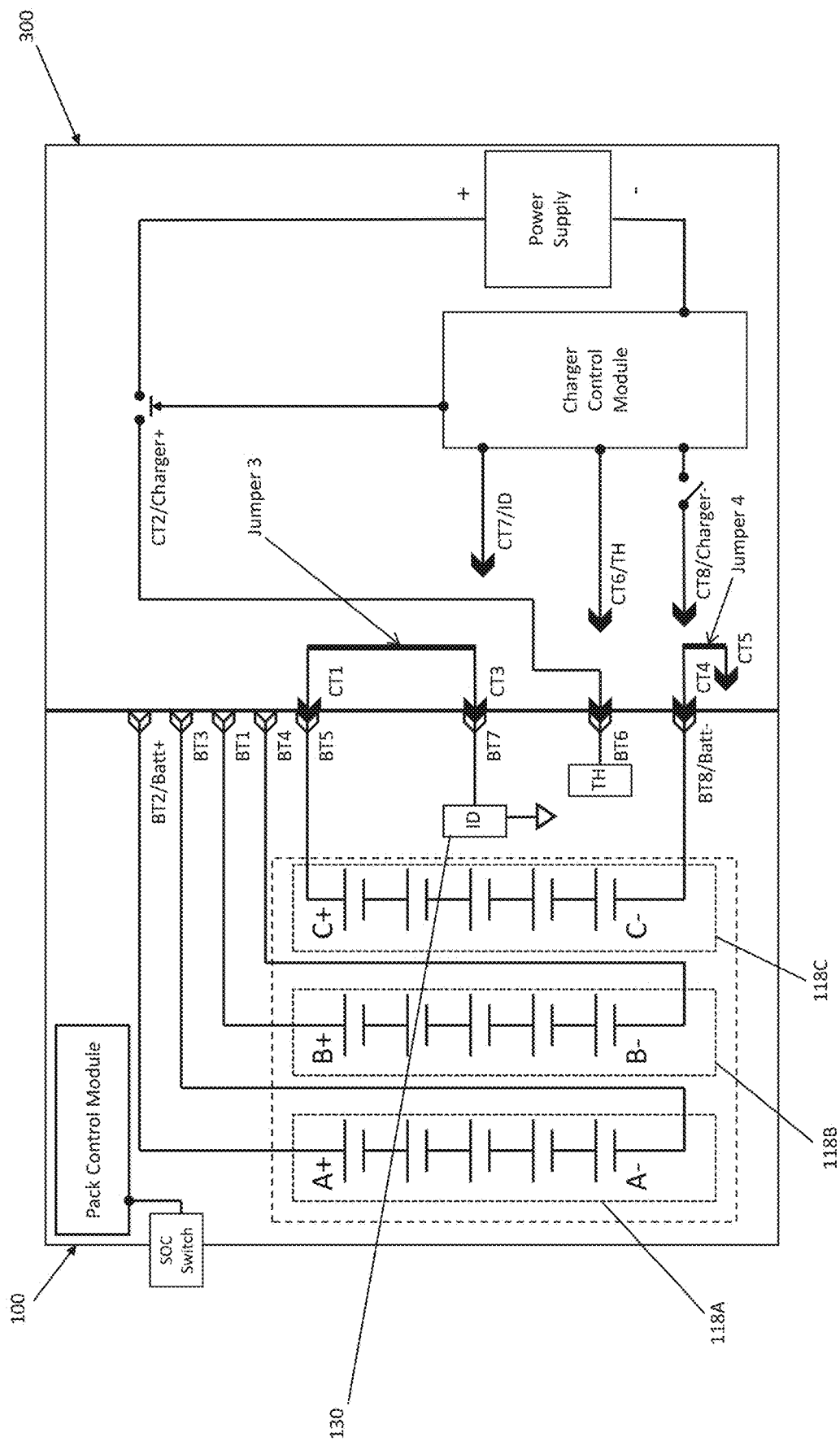
FIG. 15 is a simplified schematic diagram of the battery charger and a conventional battery pack of FIG. 5 at partial insertion of the battery pack with the battery charger.

Referring to FIGS. 12 and 14 for the combination of the battery pack and the power tool and FIGS. 13 and 15 for the combination of the battery pack and the battery pack charger, because of the physical configuration/location of the battery pack terminals and the tool/charger terminals, when the battery pack is only partially inserted into the tool or the charger (in the direction of arrow A)—such that the first row of tool/charger terminals (TT1-TT4/CT1-CT4) mate/contact with the first row of battery pack terminals (BT5-BT8)—the battery pack terminal (BT5) that is connected to the positive terminal of one of strings of battery cells, e.g., the C string, is coupled to the battery pack terminal (BT7) that is connected to the ID circuit through a pair of tool terminals (TT1 and TT3)/a pair of charger terminals (CT1 and CT3) that are connected by a first jumper (short circuit).

More specifically, when the battery pack is partially inserted to/connected with the tool, the first row of tool terminals (TT1, TT2, TT3, TT4) mates with the first row of battery pack terminals (BT5, BT6, BT7, BT8), respectively. Because TT1 is connected to TT3 by jumper #1, BT5 (connected to the C+ terminal of the C string) is connected to BT7 (connected to the ID resistor). As such, since BT5 is connected to the ID circuit and the ID circuit is connected to a ground reference, the C string of cells will discharge through the ID circuit. This will create a charge imbalance between the plurality of strings and over time, this will cause the C string to fully discharge.

It will also be the case when the battery pack is partially inserted to/connected with the charger, the first row of charger terminals (CT1, CT2, CT3, CT4) mates with the first row of battery pack terminals (BT5, BT6, BT7, BT8), respectively. Because CT1 is connected to CT3 by jumper #3, BT5 (connected to the C+ terminal of the C string) is connected to BT7 (connected to the ID circuit). As such, since BT5 is connected to the ID circuit and the ID circuit is connected to a ground reference, the C string of cells will discharge through the ID circuit. This will create a charge imbalance between the plurality of strings and over time, this will cause the C string to fully discharge.

Figure 17:
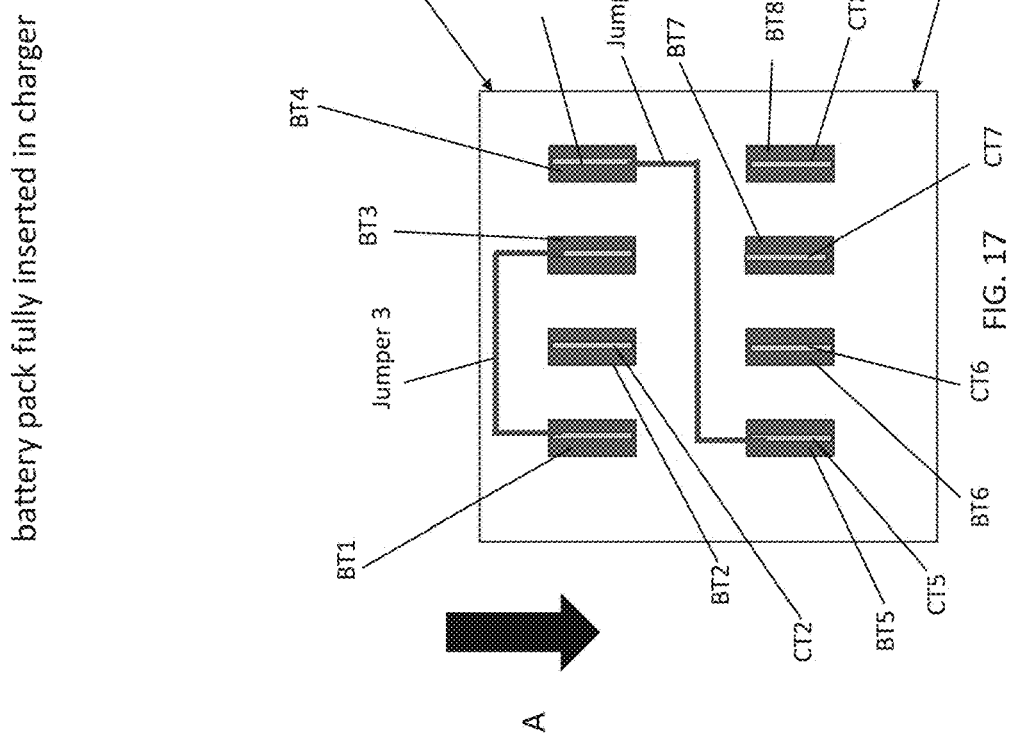
FIG. 17 is a simplified block diagram of the terminal layout of the battery charger and battery pack of FIG. 5 at full insertion of the battery pack with the battery charger.
Figure 16:
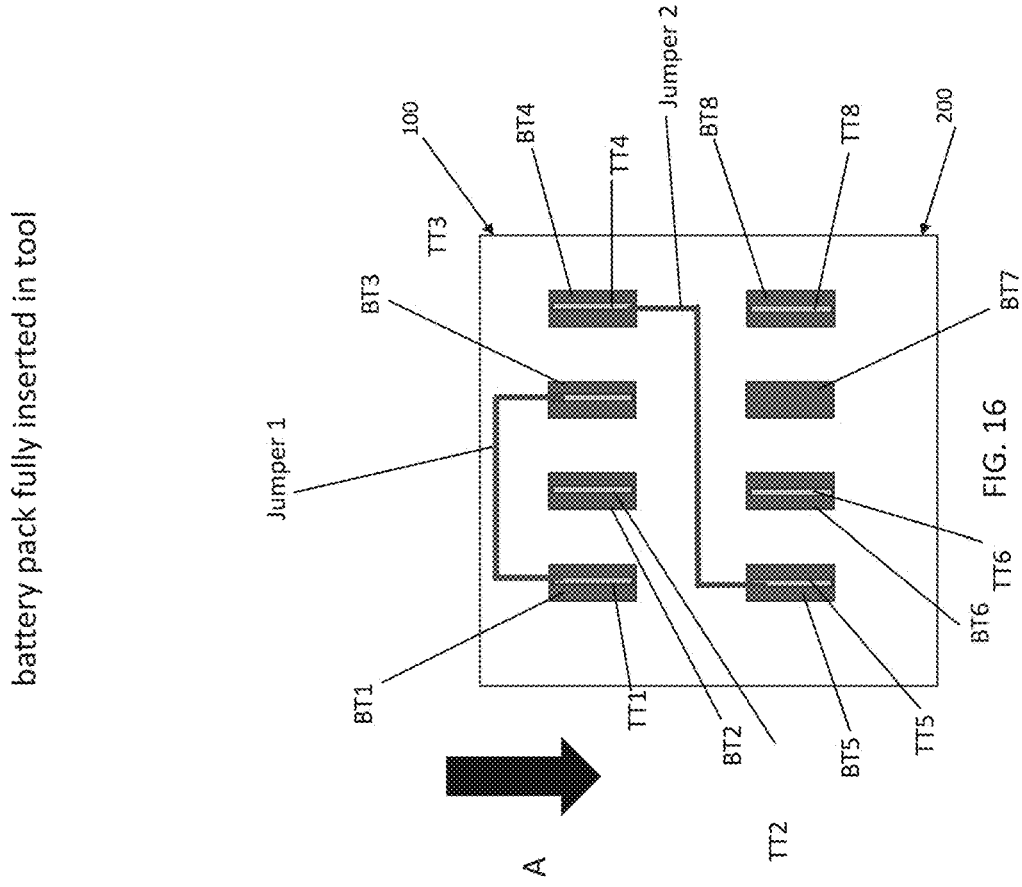
FIG. 16 is a simplified block diagram of the terminal layout of the power tool and battery pack of FIG. 2 at full insertion of the battery pack with the power tool.
Figure 18:
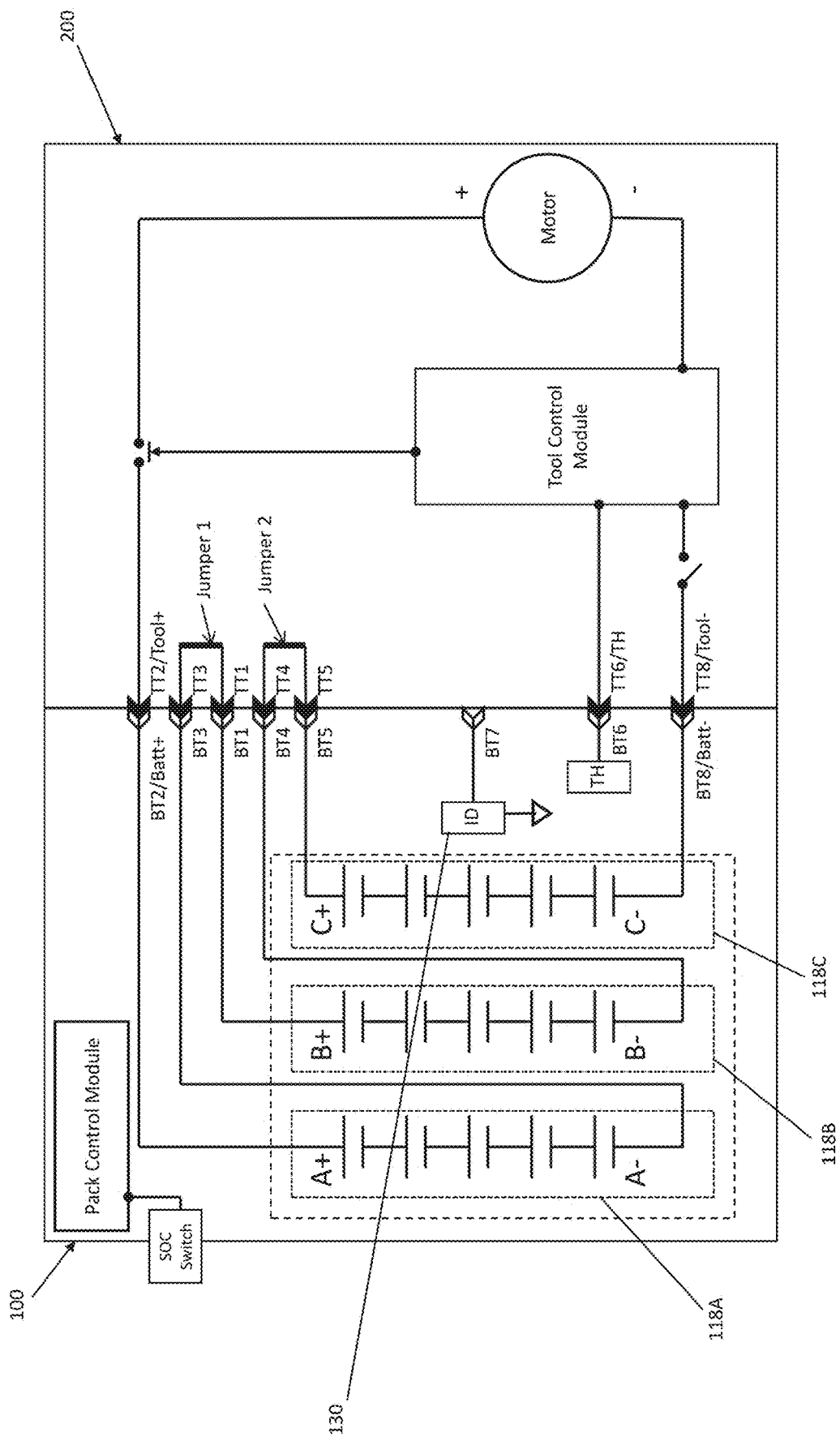
FIG. 18 is a simplified schematic diagram of the power tool and a conventional battery pack of FIG. 2 at full insertion of the battery pack with the power tool.
Figure 19:
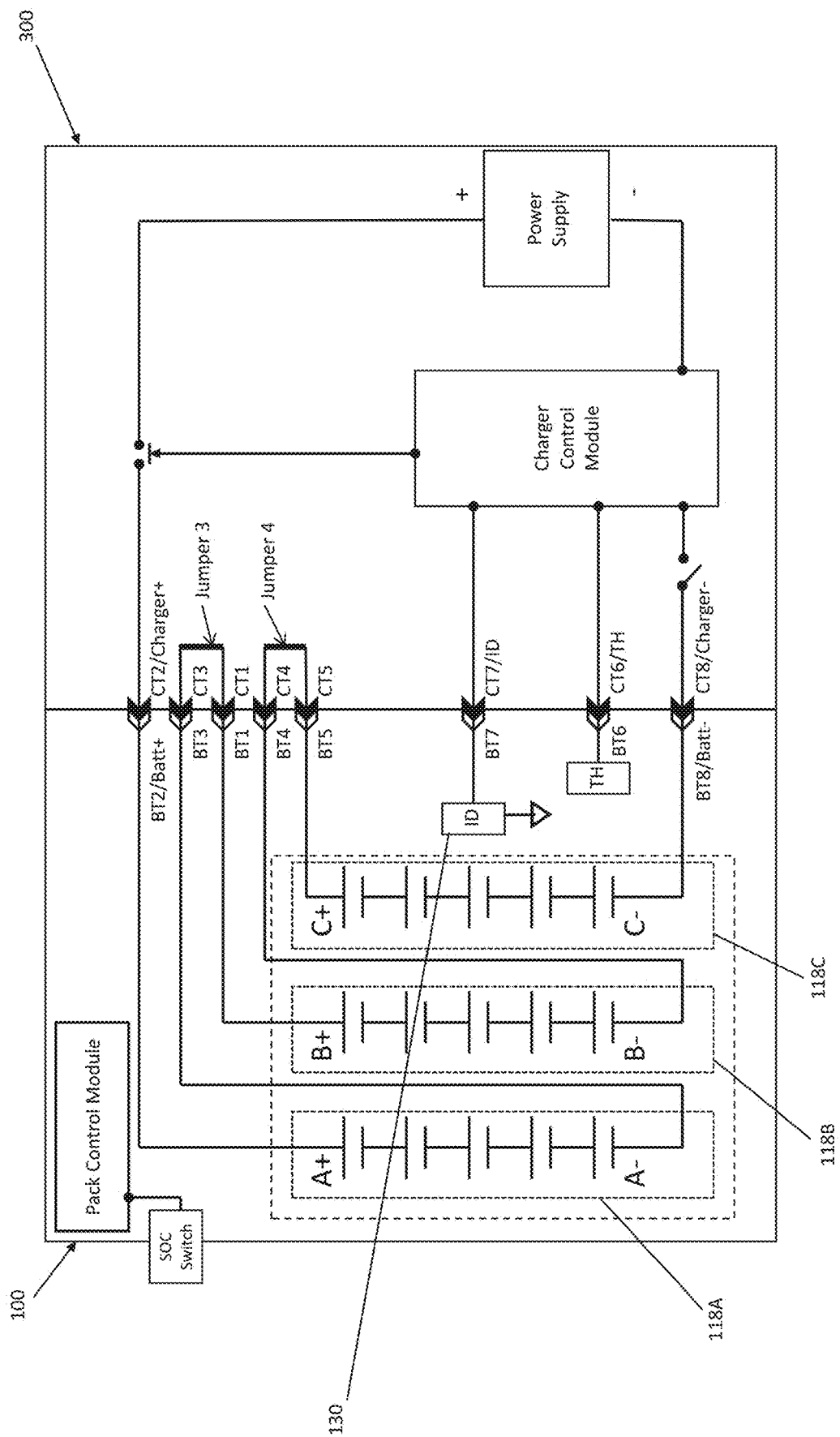
FIG. 19 is a simplified schematic diagram of the battery charger and a conventional battery pack of FIG. 5 at full insertion of the battery pack with the battery charger.

However, as illustrated in FIGS. 16 and 18, for the combination of the battery pack and the power tool, when the battery pack is fully inserted into the power tool, the first row of power tool terminals (TT1, TT2, TT3, TT4) mates with the second row of battery pack terminals (BT1, BT2, BT3, BT4), respectively and the second row of power tool terminals (TT5, TT6, TT8) mates with the first row of battery pack terminals (BT5, BT6, BT8), respectively. And, as illustrated in FIGS. 17 and 19 for the combination of the battery pack and the battery pack charger, when the battery pack is fully inserted into the battery pack charger, the first row of charger terminals (CT1, CT2, CT3, CT4) mates with the second row of battery pack terminals (BT1, BT2, BT3, BT4), respectively and the second row of charger terminals (CT5, CT6, CT7 CT8) mates with the first row of battery pack terminals (BT5, BT6, BT7, BT8), respectively.

Referring to FIGS. 20 through 25, there is illustrated a second example battery pack. In order to avoid the aforementioned charge imbalance between the plurality of strings or partial/total discharge of the one string of battery cells during a partial insertion of the battery pack and the power tool and/or the battery charger, the second example battery pack includes a controlled switch 150. The controlled switch 150 is coupled between the ID circuit and a ground reference. The controlled switch 150 may be, for example, a transistor such as a field effect transistor or a bipolar transistor.

The controlled switch 150 is coupled at a first terminal to the ID circuit and at a second terminal to a ground reference. A third terminal of the controlled switch is a control terminal. The controlled switch 150 is selected such that when a voltage at the third (control) terminal is below a selected threshold, the switch 150 will be in an open state (off condition) and when the voltage at the third (control) terminal is above the selected threshold the switch 150 will be in a closed state (on condition). In this example, the control terminal is coupled to the positive terminal of the A string of battery cells—the A+ terminal and the open state (off condition) is the default state. In this example, as the voltage at the A+ terminal is in the range of approximately 18 volts to 20 volts (five battery cells having a nominal voltage of 3.6 volts connected in series) the control threshold (voltage) of the controlled switch is selected to be greater than approximately 25 volts. In other examples with either more or fewer cells in the A string or cells having a greater or lesser nominal voltage, the control threshold of the controlled switch will be selected accordingly such that the controlled switch will be in an open state when the battery pack is not connected to another device or only partially connected to another device.

Figure 8:
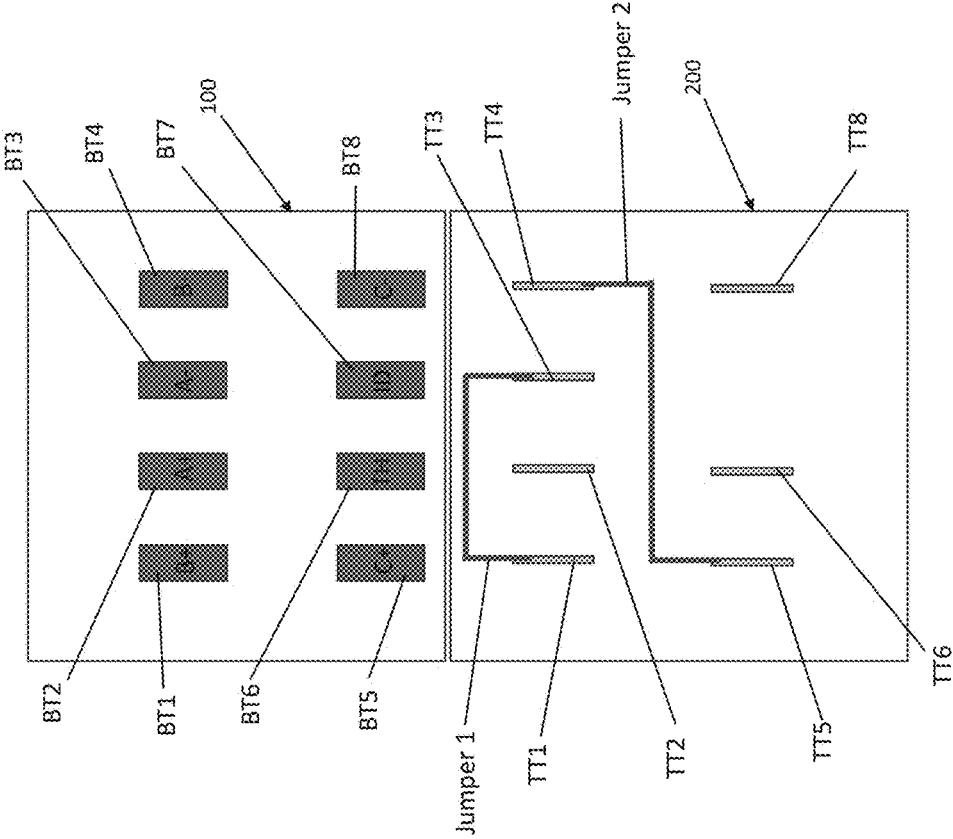
FIG. 8 is a simplified block diagram of the terminal layout of the power tool and battery pack of FIG. 2 prior to mating.
Figure 10:
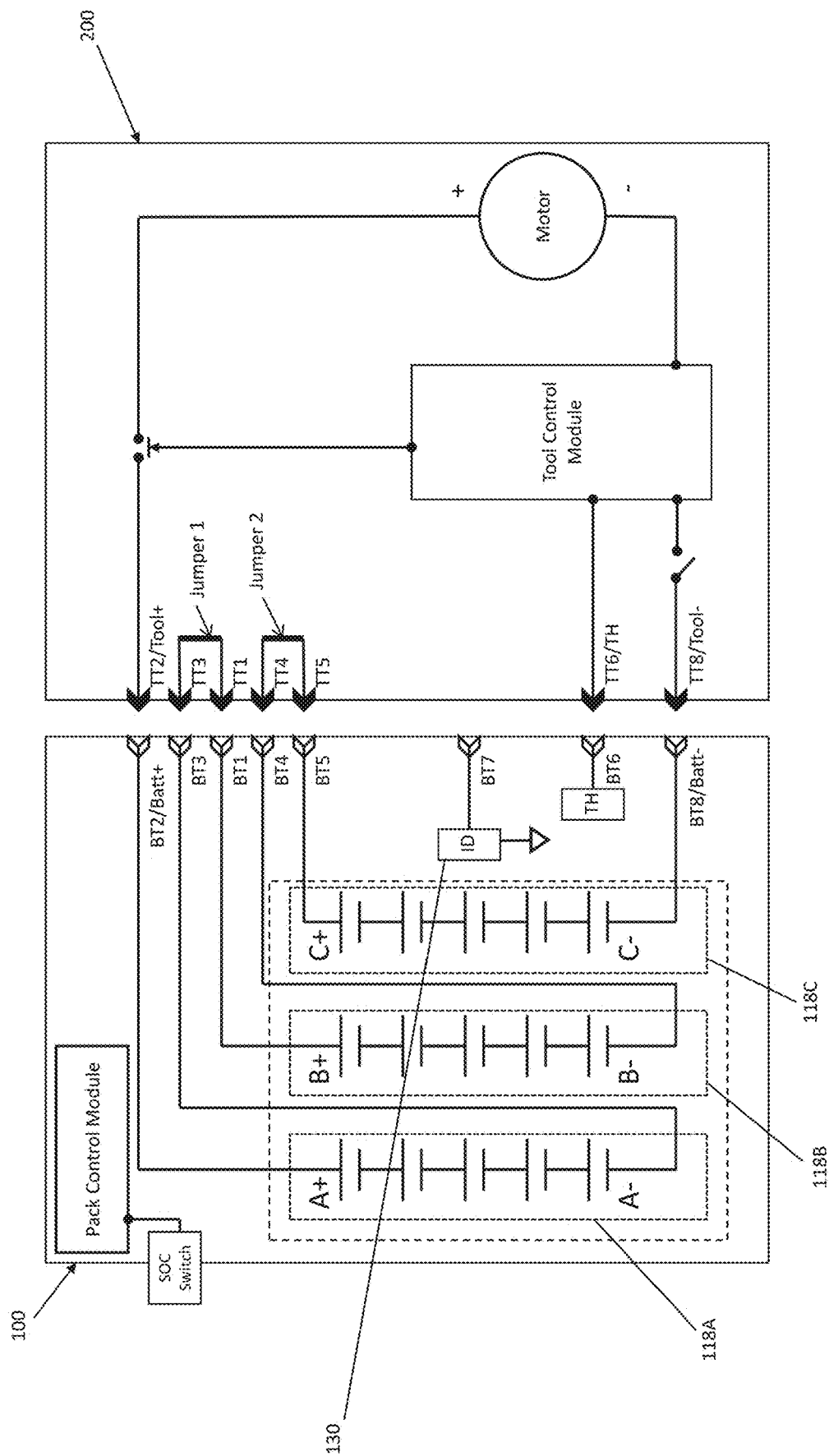
FIG. 10 is a simplified schematic diagram of a power tool and a conventional battery pack of FIG. 2 prior to mating.
Figure 11:
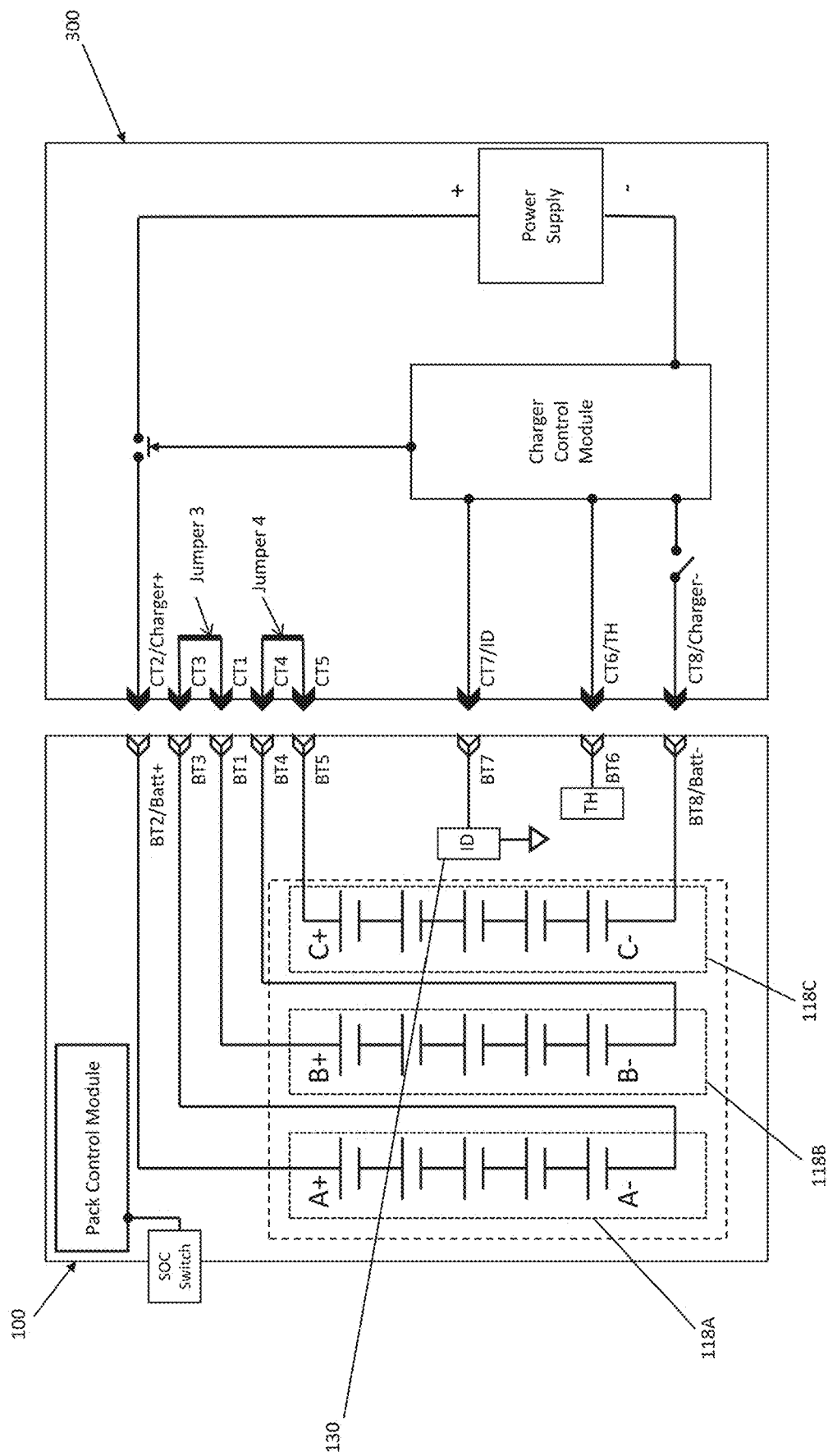
FIG. 11. is a simplified schematic diagram of a battery charger and a conventional battery pack of FIG. 5 prior to mating.
Figure 20:
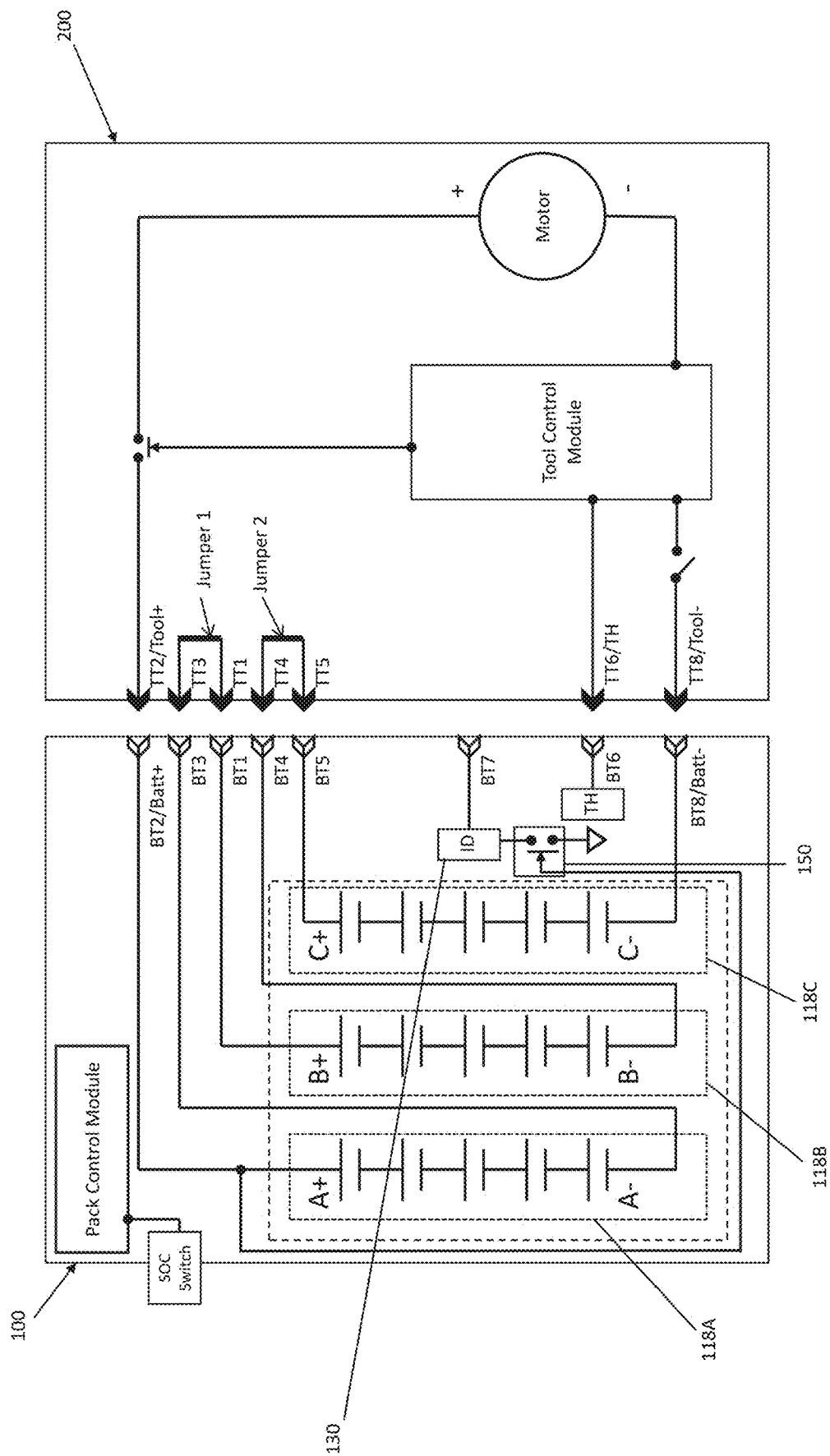
FIG. 20 is a simplified schematic diagram of a power tool and an example embodiment of a battery pack of FIG. 2 in accordance with the instant application prior to mating.

As illustrated in FIGS. 8 and 20, when the battery pack is not connected to a power tool the control signal (voltage) will be below the control threshold and the controlled switch will be in the open state. In this example, the control voltage is selected to be above the voltage at the A+ terminal.

Figure 2:
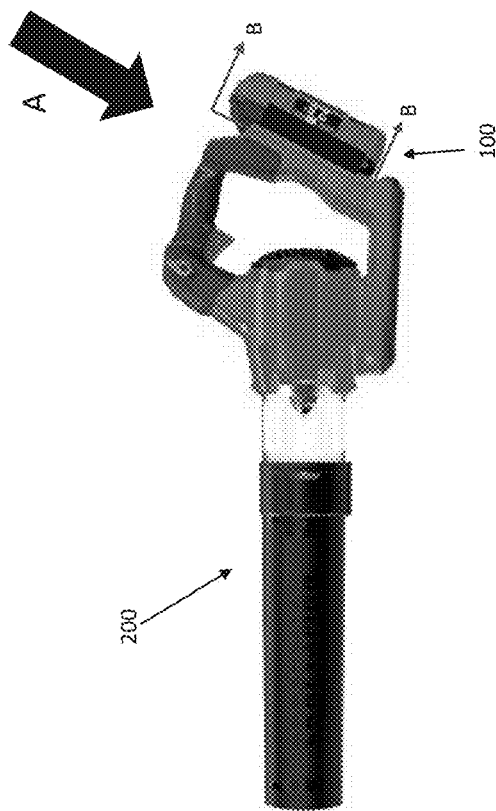
FIG. 2 is a side elevation view of a first example power tool mated with the first example battery pack of FIG. 1.
Figure 1:
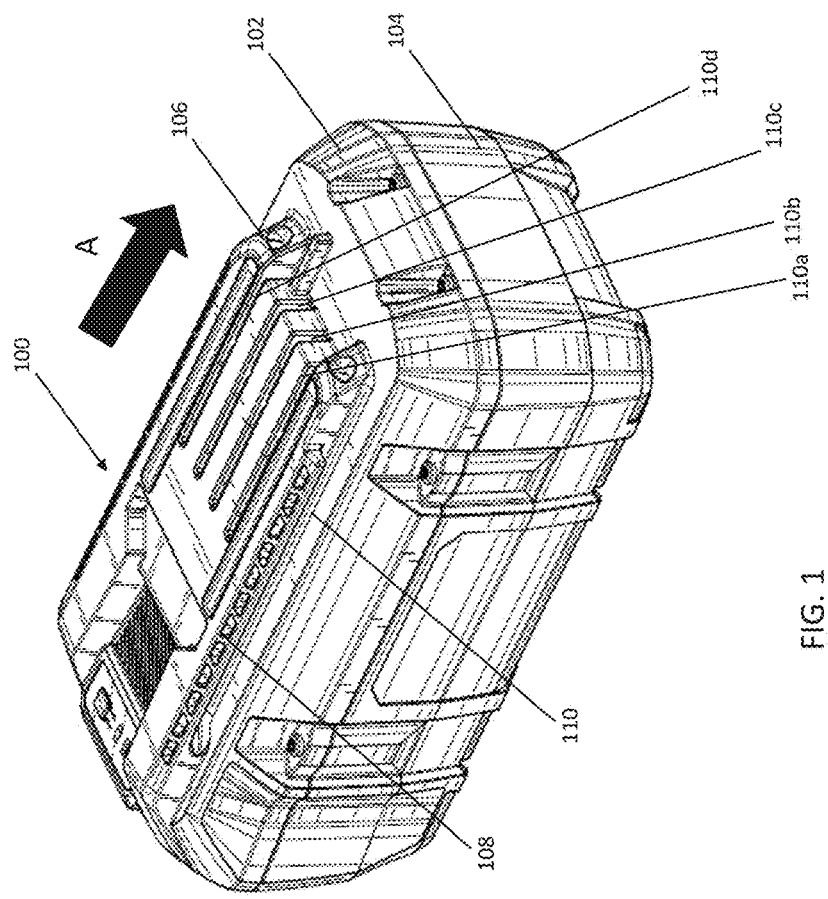
FIG. 1 is an isometric view of a first example battery pack.
Figure 7:
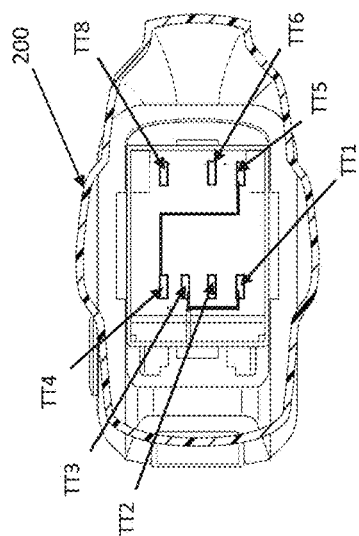
FIG. 7 is a plan, section view of the power tool and battery pack of FIG. 2 along section line A-A.
Figure 6:
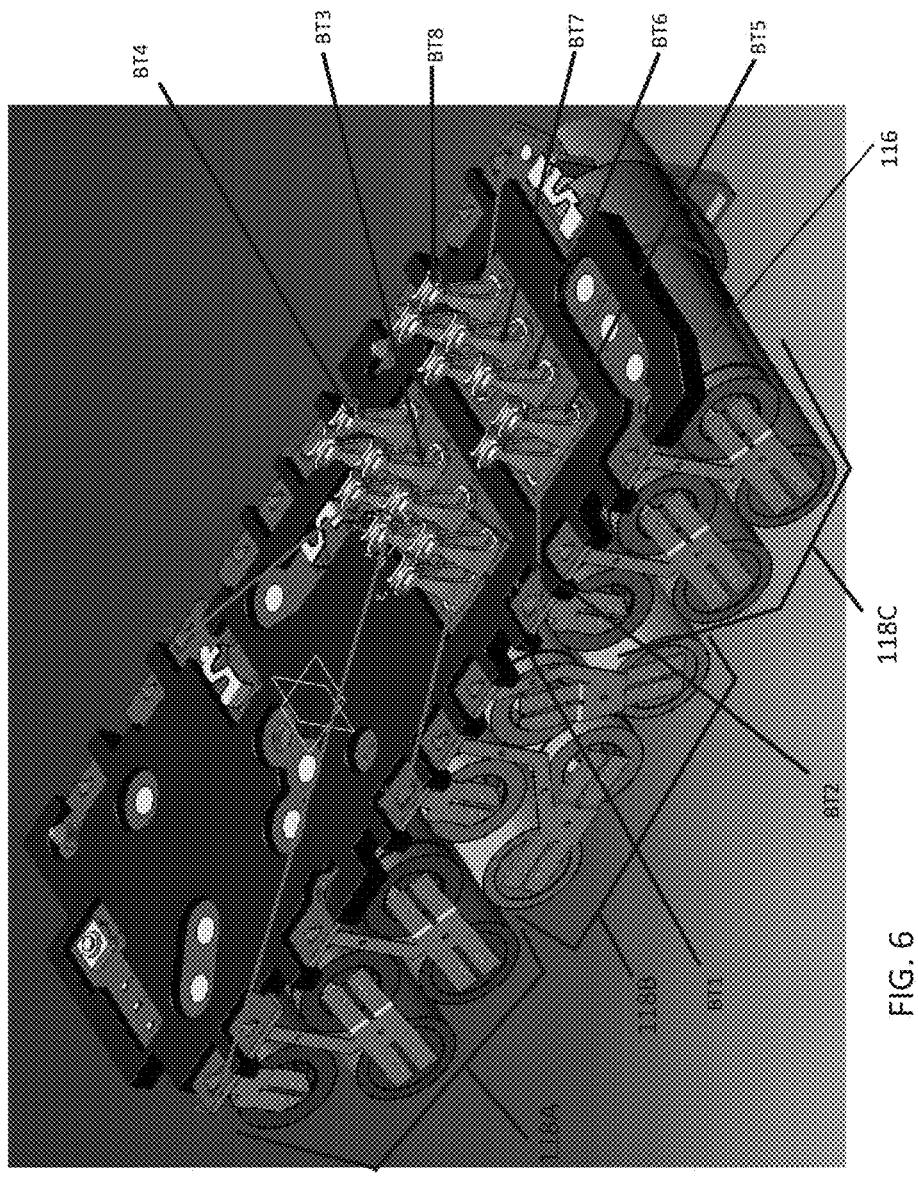
FIG. 6 is an isometric view of a plurality of battery cells, printed circuit board and terminals of the battery pack of FIG. 1.
Figure 9:
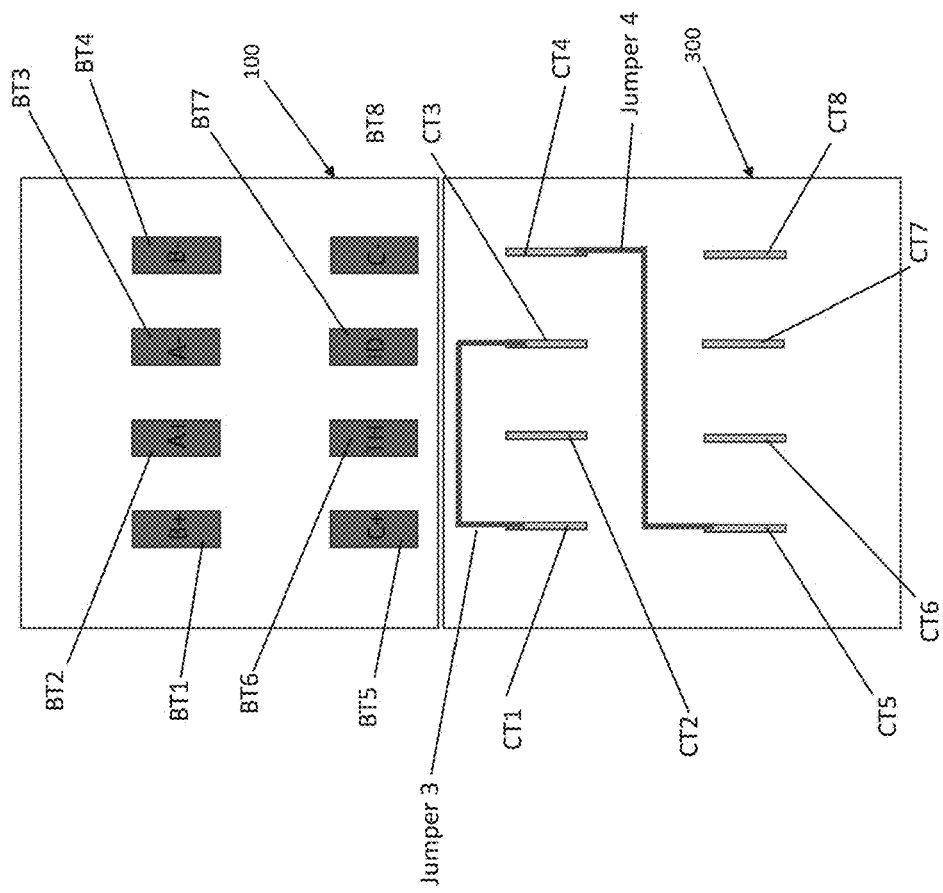
FIG. 9 is a simplified block diagram of the terminal layout of the battery charger and battery pack of FIG. 5 prior to mating.
Figure 23:
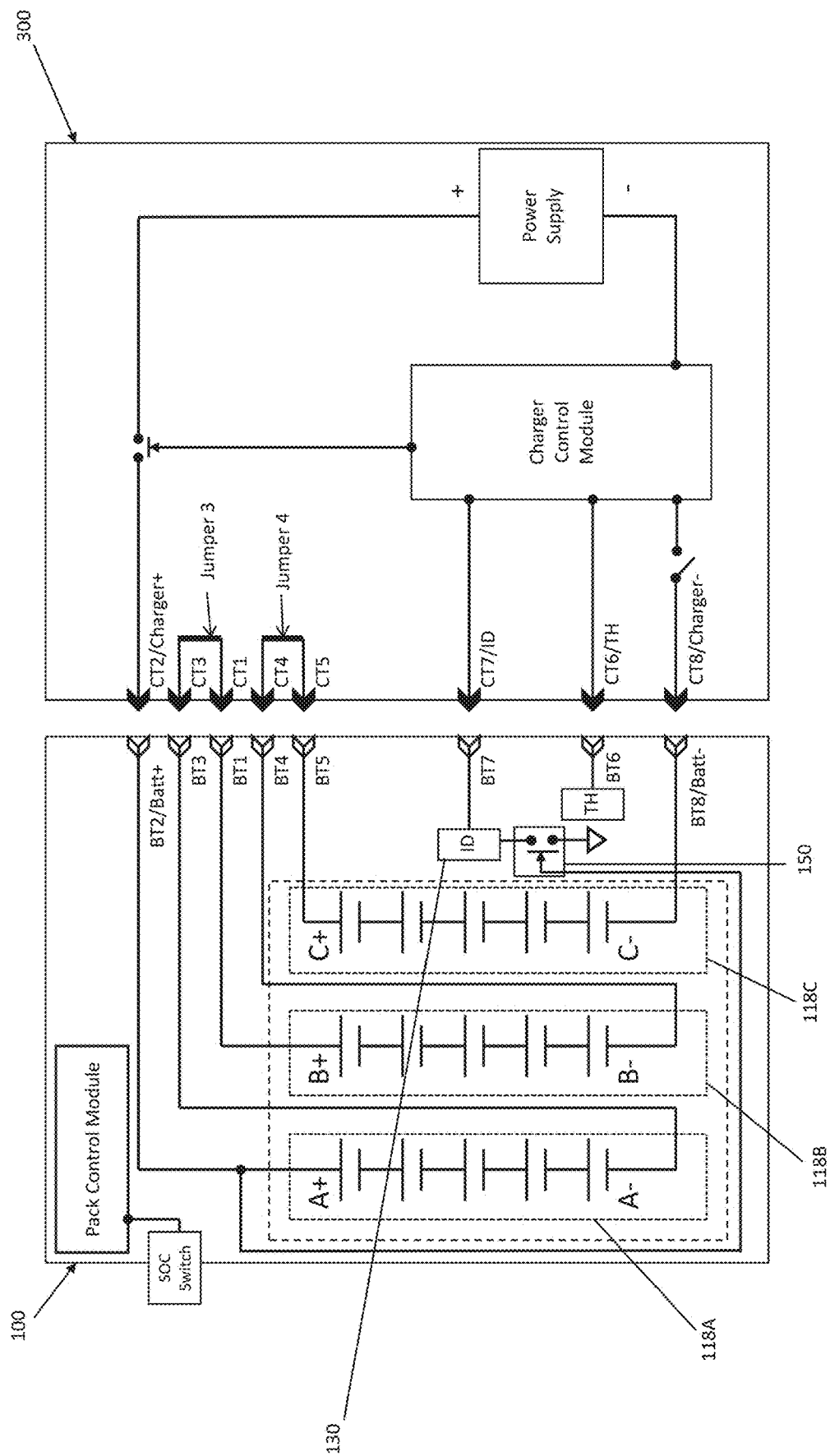
FIG. 23 is a simplified schematic diagram of a battery charger and an example embodiment of a battery pack of FIG. 5 in accordance with the instant application at partial insertion.

As illustrated in FIGS. 9 and 23, when the battery pack is not connected to a battery charger the control signal (voltage) will be below the control threshold and the controlled switch will be in the open state. In this example, the control voltage is selected to be above the voltage at the A+ terminal.

Figure 21:
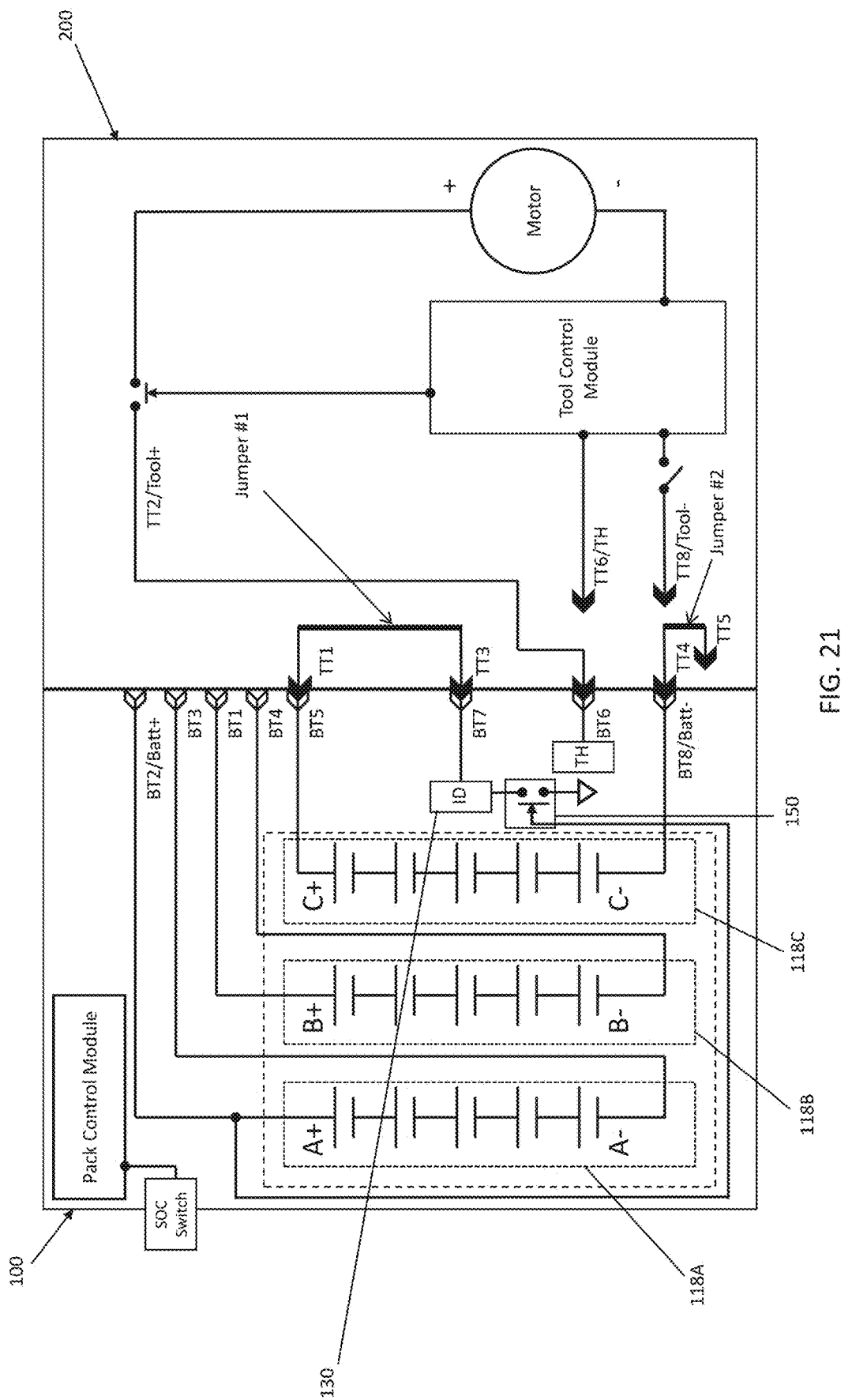
FIG. 21 is a simplified schematic diagram of a battery charger and an example embodiment of a battery pack of FIG. 5 in accordance with the instant application prior to mating.

As illustrated in FIGS. 12 and 21, when the battery pack is partially inserted to/connected with the power tool, the first row of tool terminals (TT1, TT2, TT3, TT4) mates with the first row of battery pack terminals (BT5, BT6, BT7, BT8), respectively. Because TT1 is connected to TT3 by jumper #1, BT5 (connected to the C+ terminal of the C string) is connected to BT7 (connected to the ID circuit). However, while the C+ terminal of the C string of battery cells is coupled to the ID circuit through the battery pack terminal BT5, because the control signal (voltage) is below the control threshold—because the voltage at the A+ terminal has not changed—the controlled switch will be (remain) in the open state. As such, the C string of battery cells is not connected to ground and will not drain.

Figure 24:
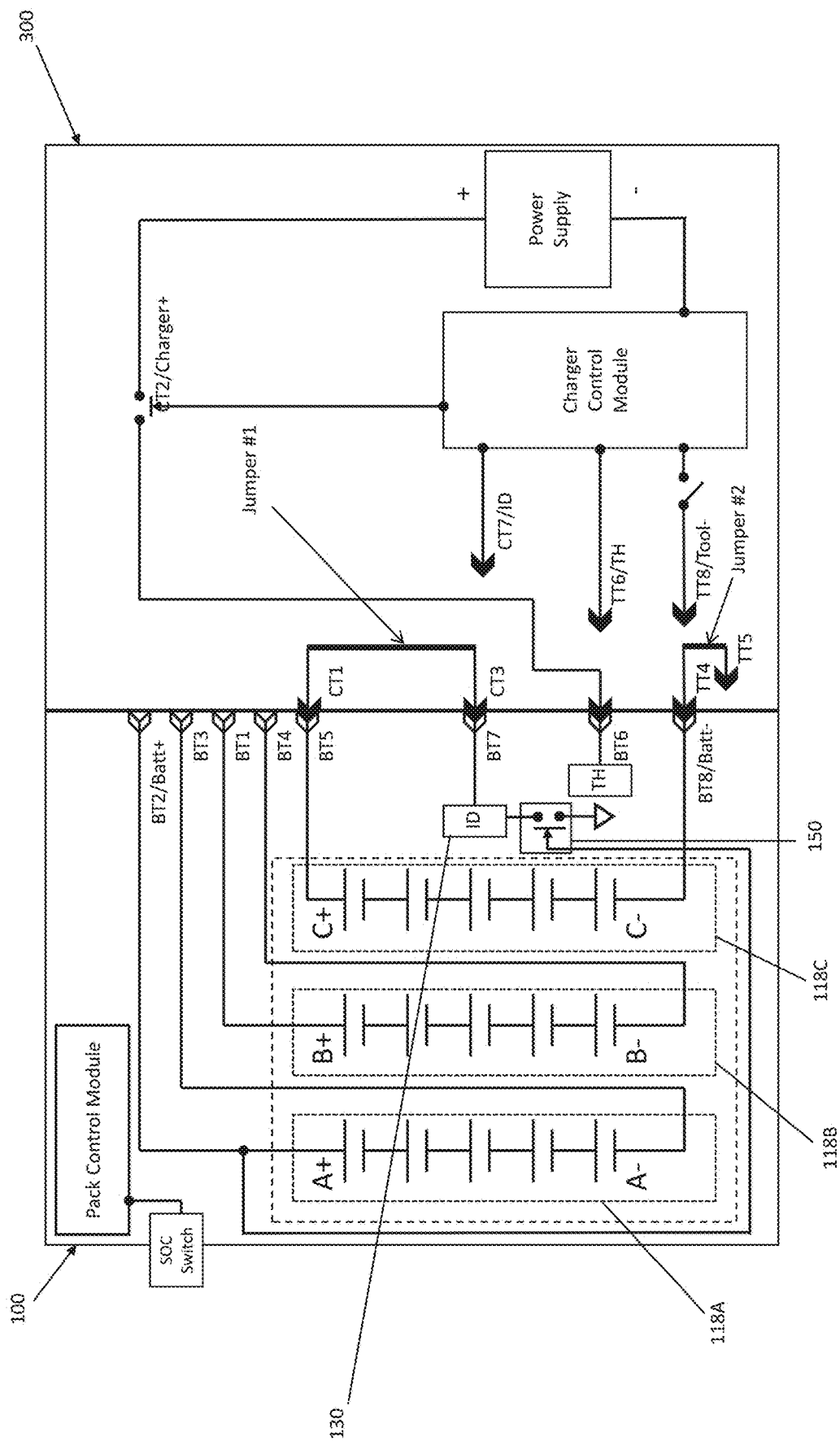
FIG. 24 is a simplified schematic diagram of a power tool and an example embodiment of a battery pack of FIG. 2 in accordance with the instant application at full insertion.

Furthermore, as illustrated in FIGS. 13 and 24, when the battery pack is partially inserted to/connected with the charger, the first row of charger terminals (CT1, CT2, CT3, CT4) mates with the first row of battery pack terminals (BT5, BT6, BT7, BT8), respectively. Because CT1 is connected to CT3 by jumper #3, BT5 (connected to the C+ terminal of the C string) is connected to BT7 (connected to the ID circuit). However, while the C+ terminal of the C string of battery cells is coupled to the ID circuit through the battery pack terminal BT5, because the control signal (voltage) will still be below the control threshold—because the voltage at the A+ terminal has not changed—the controlled switch will be (remain) in the open state. As such, the C string of battery cells is not connected to ground and will not drain.

Figure 22:
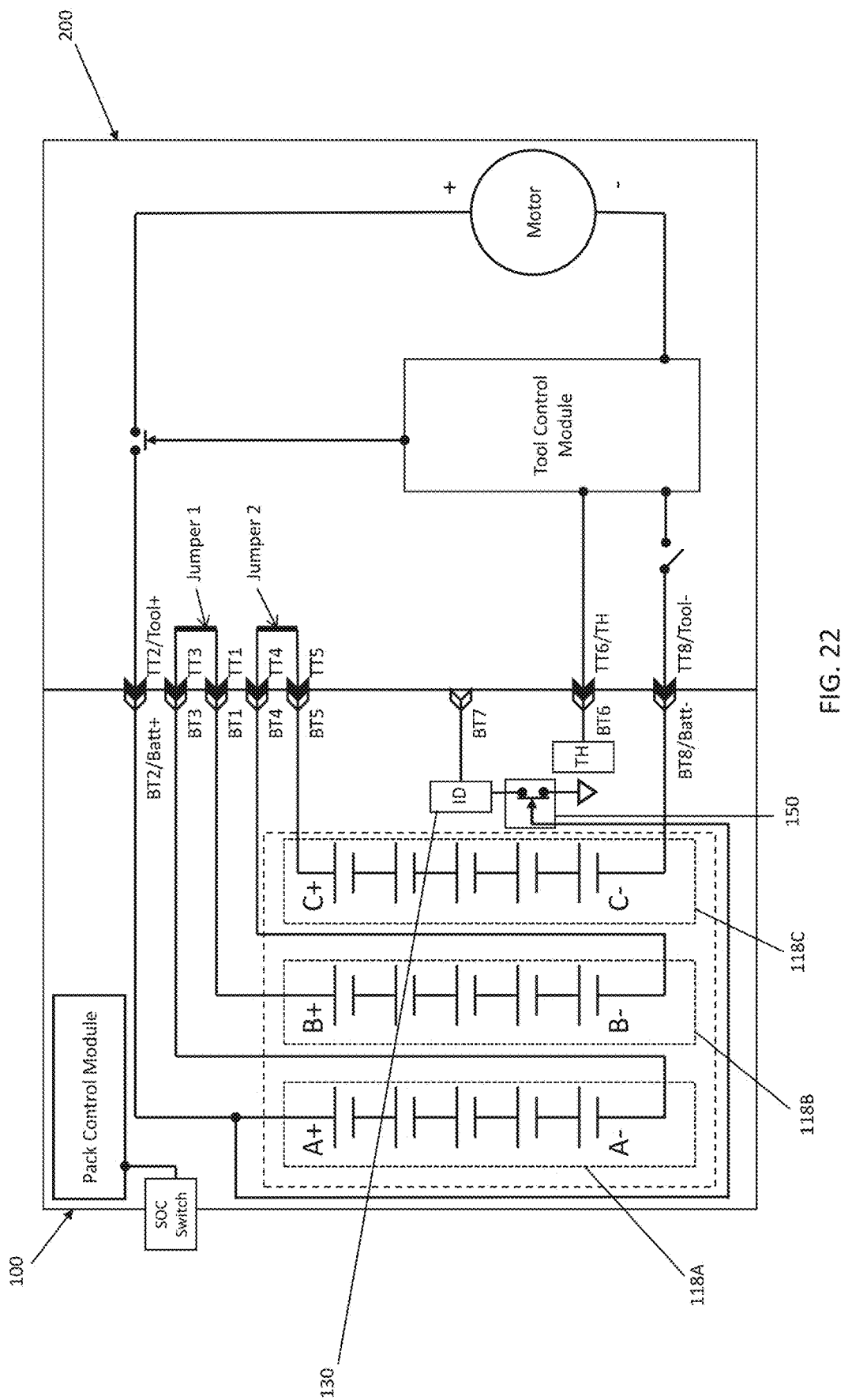
FIG. 22 is a simplified schematic diagram of a power tool and an example embodiment of a battery pack of FIG. 2 in accordance with the instant application at partial insertion.

As illustrated in FIGS. 16 and 22, when the battery pack is fully inserted to a power tool the first row of tool terminals (TT1, TT2, TT3, TT4) mates with the second row of battery pack terminals (BT1, BT2, BT3, BT4), respectively and the second row of tool terminals (TT5, TT6, TT8) mates with the first row of battery pack terminals (TT5, TT6, TT8)—as there is no tool terminal TT7 in this embodiment of the power tool, no power tool terminal mates with battery pack terminal BT7 when the battery pack is fully inserted to the power tool—the control signal (voltage) will be above the control threshold—because the voltage at the A+ terminal is now at a voltage equal to the voltage of the A string of battery cells plus the voltage of the B string of battery cells plus the voltage of the C string of battery cells (the A string of battery cells and the B string of battery cells and the C string of battery cells being connected in series by jumper #1 and jumper #2 of the tool)—and the controlled switch will be in the closed state.

Figure 25:
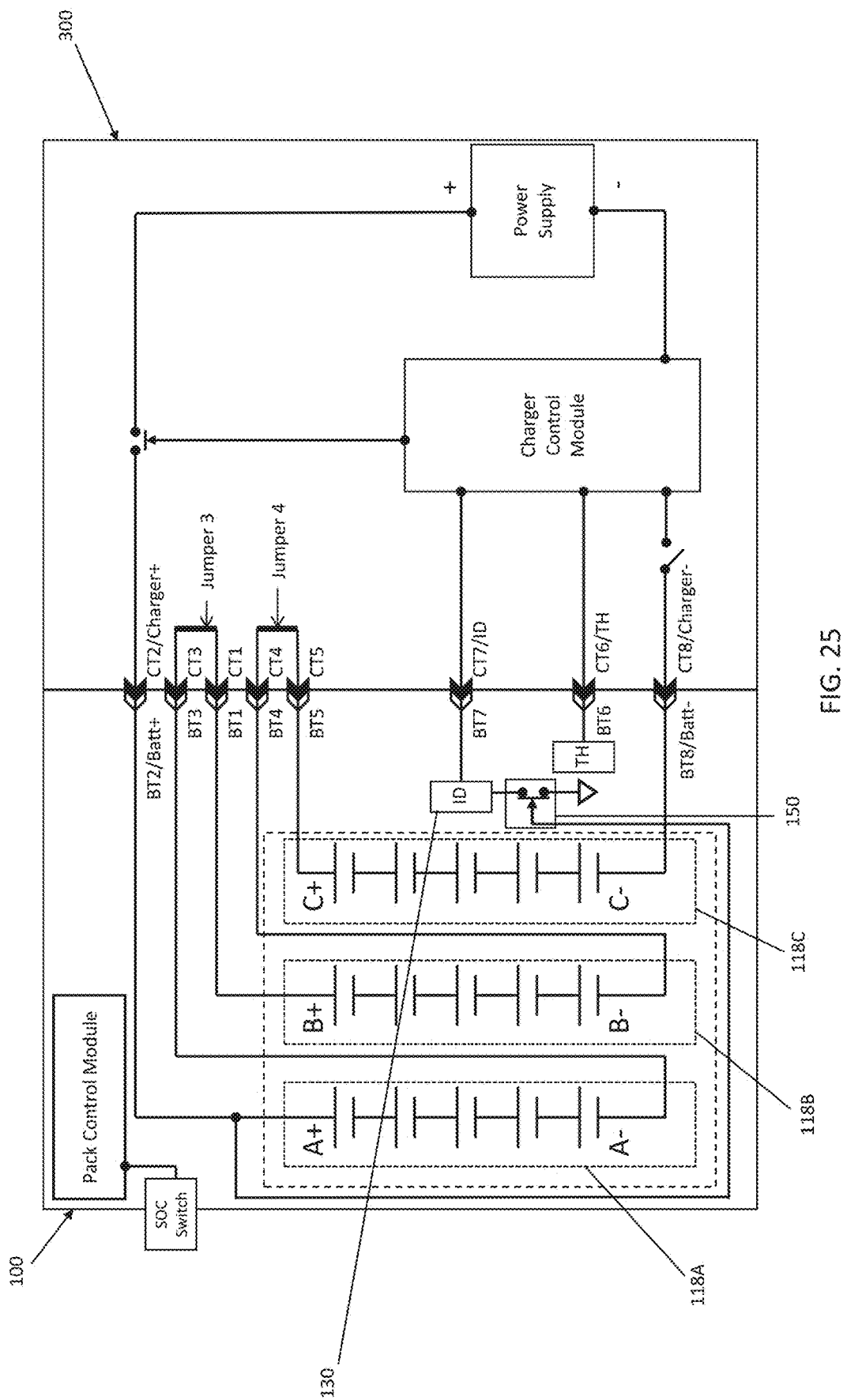
FIG. 25 is a simplified schematic diagram of a battery charger and an example embodiment of a battery pack of FIG. 5 in accordance with the instant application at full insertion.

As illustrated in FIGS. 17 and 25, when the battery pack is fully inserted to a battery charger the first row of charger terminals (CT1, CT2, CT3, CT4) mates with the second row of battery pack terminals (BT1, BT2, BT3, BT4), respectively and the second row of charger terminals (CT5, CT6, CT7, CT8) mates with the first row of battery pack terminals (TT5, TT6, TT7, TT8) the control signal (voltage) will be above the control threshold—because the voltage at the A+ terminal is now at a voltage equal to the voltage of the A string of battery cells plus the voltage of the B string of battery cells plus the voltage of the C string of battery cells (the A string of battery cells and the B string of battery cells and the C string of battery cells being connected in series by jumper #3 and jumper #4 of the charger)—and the controlled switch will be in the closed state.

Importantly, as illustrated in FIG. 25, when the battery pack is fully inserted with the battery pack charger and the controlled switch is closed, the ID circuit will be coupled to ground and the ID circuit will provide an accurate and appropriate signal (voltage) to the charger control module to enable the charger to properly charge the battery pack.

In an alternate example embodiment of a battery pack having three strings of battery cells, the control terminal of the controlled switch could be connected to the positive terminal of the B string of battery cells. In another alternate example embodiment of a battery pack, the battery pack could have two strings of battery cells and the control terminal of the controlled switch could be connected to the positive terminal of the string of battery cells not coupled to the ID circuit during partial insertion.

Numerous modifications may be made to the exemplary implementations described above. These and other implementations are within the scope of this application.

The invention claimed is:

1. A battery pack, comprising: a battery pack housing; a plurality of battery pack terminals; a plurality of battery cells within the battery pack housing, the plurality of battery cells electrically coupled to a set of the plurality of battery pack terminals; a battery pack identification circuit electrically coupled to one of the plurality of battery pack terminals and electrically isolated from a ground reference, the battery pack identification circuit including components that characterize the battery pack; and a controllable switch having a first terminal electrically coupled to the battery pack identification circuit and second terminal electrically coupled to the ground reference, the controllable switch having a first state in which the controllable switch is open and the battery pack identification circuit is electrically isolated from the ground reference and a second state in which the controllable switch is closed and the battery pack identification circuit is electrically coupled to the ground reference.

2. The battery pack, as recited in claim 1, wherein a control terminal of the controllable switch is electrically coupled to a terminal of one of the plurality of battery cells.

3. The battery pack, as recited in claim 1, the battery pack including an interface for mating with a corresponding interface of a power tool and wherein the controllable switch is set to a closed state upon the battery pack interface fully mating to the power tool interface.

4. The battery pack, as recited in claim 1, the battery pack including an interface for mating with a corresponding interface of a battery pack charger and wherein the controllable switch is set to a closed state upon the battery pack interface fully mating to the battery pack charger.

5. The battery pack, as recited in claim 3, wherein the plurality of battery cells are coupled together in a first string of serially connected cells and a second string of serially connected cells and the first string of cells and the second string of cells are serially connected when the battery pack is fully mated to the power tool.

6. The battery pack, as recited in claim 4, wherein the plurality of battery cells are coupled together in a first string of serially connected cells and a second string of serially connected cells and the first string of cells and the second string of cells are serially connected when the battery pack is fully mated to the battery pack charger.

7. A method of operating a battery pack, comprising the steps of:
providing battery pack having a battery pack housing, a plurality of battery pack terminals, a plurality of battery cells within the battery pack housing, the plurality of battery cells electrically coupled to a set of the plurality of battery pack terminals, a battery pack identification circuit electrically coupled to one of the plurality of battery pack terminals and electrically isolated from a ground reference, the battery pack identification circuit including components that characterize the battery pack, and a controllable switch having a first terminal electrically coupled to the battery pack identification circuit and a second terminal electrically coupled to the ground reference, the controllable switch having a first state in which the controllable switch is open and the battery pack identification circuit is electrically isolated from the ground reference and a second state in which the controllable switch is closed and the battery pack identification circuit is electrically coupled to the ground reference; and controlling the controllable switch to from the first state to the second state upon the battery pack fully mating with a power tool.

8. The method of claim 7, further comprising the step of electrically coupling a control terminal of the controllable switch to a terminal of one of the plurality of battery cells.

9. The method of claim 8, further comprising the step of coupling the plurality of battery cells together in a first string of serially connected cells and a second string of serially connected cells and coupling the first string of cells and the second string of cells in series upon the battery pack fully mating to the power tool.

* * * * *